Patented June 17, 1924.

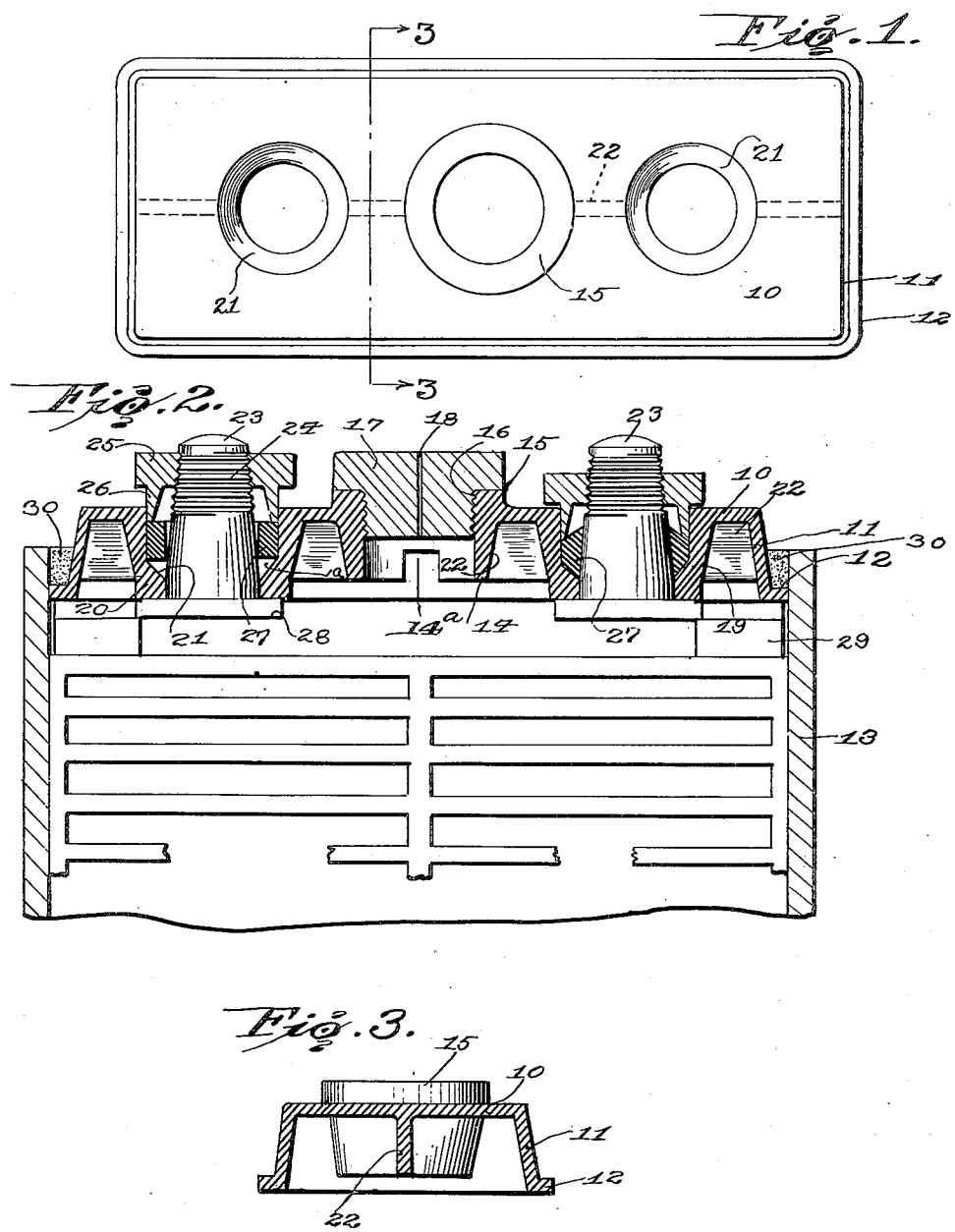

1,498,080

UNITED STATES PATENT OFFICE.

JOHN EDWARD ERICKSON, OF LINCOLN, NEBRASKA.

JAR COVER OR CELL COVER FOR STORAGE-BATTERY CELLS.

Application filed December 1, 1920. Serial No. 427,543.

*To all whom it may concern:*

Be it known that I, JOHN EDWARD ERICKSON, a citizen of the United States, residing at Lincoln, in the county of Lancaster and State of Nebraska, have invented certain new and useful Improvements in Jar Covers or Cell Covers for Storage-Battery Cells, of which the following is a specification, reference being had to the accompanying drawings.

This invention relates to storage batteries, and particularly to the covers used for closing the upper ends of the individual cells used in storage batteries.

One of the objects of this invention is to provide a cover for this purpose so formed as to securely hold the posts extending from the battery elements and which will act to hold the plates or elements from moving in the jar or cell, eliminating to a great extent the chance of the plates chafing against the separators.

A further object is to provide a cell cover which will be leak-proof, which will prevent acid from creeping up around the posts, and which is particularly convenient in constructing or making repairs.

The main object is to provide means whereby the burr or nut surrounding the post may have liquid-tight engagement with the casing surrounding the post and disposed in the recess in the cover to thereby do away with the use of any sealing compound around the post.

Other objects will appear in the course of the following description.

My invention is illustrated in the accompanying drawings, wherein:—

Figure 1 is a plan view of a battery cell cover constructed in accordance with my invention;

Figure 2 is a longitudinal sectional view through the cover and through a portion of a cell;

Figure 3 is a cross section on the line 3—3 of Figure 1.

Referring to the drawings, 10 designates the cover generally, which is preferably made of hard rubber, hard fiber or other suitable material, and which will be about $\frac{1}{8}''$ in thickness. This cover around its margin has downwardly inclined side walls 11 each formed with a flange 12, and the cover preferably fits inside of the cell 13. The cover is supported upon the connecting strap of the plates. At its middle, the cover is formed on its under face with a downwardly extending, annular flange 14. This flange extends above the plane of the cover, as at 15, and is interiorly screw-threaded for a short distance downward from the upper end of the flange 15, as at 16, for the reception of the usual screw-threaded plug 17 provided with the usual vent opening 18. The flange 14 at its lower end is slotted or notched at opposite points, as at 14ª, to within about $\frac{1}{16}''$ of the underside of the cover. This flange 14 is less in depth than the depth of flange 12. On each side of the vent opening which is defined by the flange 14, there is disposed a post well formed by the depending flange 19. The inside face of this flange is concentric to the axis of the post well and parallel thereto so that the inside diameter of the post well is uniform throughout its length. At its lower end the wall 19 of the post well is formed with an inwardly projecting flange 20, the upper face of this flange being bevelled, as at 21. The outer face of the wall 19 is inclined, as is the outer face of the wall 14, and these walls 19 and the wall 14 are connected to each other and to the wall 11 by longitudinally extending webs 22 which are integral with the cover.

The battery posts 23 taper upwardly. At its base, each post has a diameter of approximately $\frac{3}{4}''$, for instance, which is the same as the interior diameter of the aperture defined by the flange 20. At its upper end, each post is approximately $\frac{5}{8}''$ in diameter. Each post is of lead, and for a distance from its lower end equal to the thickness of the flange 20. The post has a uniform diameter slightly less than the internal diameter of the wall 19 and above this portion of uniform diameter the post tapers upward so that at no point in the entire length of the post is the post of greater diameter than the interior diameter of the wall 19. Each post may be threaded, as at 24, and engaging the thread of each post is a burr or nut 25 which is interiorly threaded. This burr is formed on its under face with a flange 26 having a uniform exterior diameter, the interior diameter of the flange, however, becoming smaller toward the body of the burr so that the inner face of the flange is inclined, providing a relatively sharp lower edge for the flange. The exterior diameter of the flange 26 is such that it fits snugly within the wall 19 of the well. Disposed between the inclined face 21 of flange 20 and this flange 26 of the burr 25 is a gasket 27 of rubber or like material, which is of such width that it will fill the space between the wall 19 and the post, and when the burr or nut 25 is screwed down on the post, the flange 26 will bear against the upper face of this gasket and force the gasket into the space $a$ between the inclined face 21 and the post. When the nut or burr is screwed down on the post 23, it will obviously draw the post upward relatively to the cover and the flange 26, as before stated, will compress the gasket 27 into the space $a$ and cause this gasket to fit tightly around the post so that no possible leakage can occur between the post and the gasket, as shown on the right hand side of Figure 2. The post is attached to a connecting plate strap or bar 28, which in turn will be connected to lugs 29 on the positive or negative plates or elements of the battery cell in the usual manner. Of course, the space between the wall 13 of the cell and the inclined marginal wall 10 of the cover will be filled with petrolite 30 or other suitable or usual wax-like composition, this composition being therefore below the top of the battery cover.

The construction which I have shown for engaging the posts 23 is such that it not only makes the cell leak-proof as regards any leakage around the posts, but it will hold the plates or elements from moving in the cell, thus reducing to a great extent the chances of the plates chafing against or through the separators. This is due to the fact that the wall 19 has a depth equal to the depth of the wall 11 so that the lower face of the annular wall 19 is flush with the lower face of the wall 11, as illustrated clearly in Figure 2. The connecting strap 28 for one set of battery plates, it will be seen from Figure 2, bears flat against the lower edge of the wall 19 and also flat against the under face of the flange 12. Thus the plate strap 28 is supported not only against the under face of the marginal flange 12 at opposite points but against the annular under face of the wall 19, when the nut 25 is turned down and the battery post is fully drawn up by the nut.

Storage batteries are subjected to jar and vibration when a motor car is running of such character that the battery plates tend to vibrate and thus chafe against the separators between the battery plates so that the paste on the battery plates or grids is very liable to be worn away. The further away the connecting strap 28 is from a supporting element, the greater will be this vibration of the battery plates, but by causing the straps 28 of the two sets of battery elements to be engaged tightly with the under face of the flange 12 and with the under edge faces of the walls 19, the battery plates are prevented from having anything but a minimum of vibration. Furthermore, the ends of the cover are supported by the plate straps and thus will be much less likely to be broken down by pressure on the top. By reason of the cover fitting firmly on the plate straps, the vibration of the battery plates is eliminated to the greatest possible degree. The bracing webs 22 act to strengthen the relatively thin, hard rubber of which the cover is formed and tend to prevent the inwardly projecting walls of the well and of the vent being broken if the cover should be dropped or jarred.

It will be noted that no sealing compound whatever is used around the post wells or over the top of the cover, but that the only place the sealing compound is used is between the inclined wall 10 of the cover and the wall 13 of the cell. Furthermore, the construction which I have produced is particularly convenient both as regards the making of the cover and as regards the making of repairs. It will be noted that the web 22 connecting the walls of the wells and of the vent with the side wall 11 of the cover serves to strengthen the walls of the wells which is necessary because of the pressure which will be exerted upon the walls of the wells through which the posts pass.

I claim:—

1. The combination with a battery cell cover having a depending, annular wall forming the post receiving well, the interior surface of the well being smooth and unobstructed, the wall at its lower end being formed with an inwardly projecting annular flange having an inclined upper face extending to the opening of the post receiving well, of a battery element post extending through the well and fitting the lower end thereof, a gasket normally rectangular in cross section surrounding the post and fitting the same and disposed upon the upper face of the inwardly extending, annular flange of the wall, and a nut having a screw-threaded engagement with the post, the nut being formed with a downwardly extending flange, the outer face of the flange being uniform in diameter, the inner face of the flange being inclined downward and outward whereby the flange of the nut will act to force the outer margin of the gasket downward against the inclined face of the flange of the wall and thus inward against the post.

2. The combination with a battery cell cover having a depending, annular wall forming the post receiving well, the wall at its lower end being formed with an inwardly projecting annular flange having an inclined upper face extending to the inner face of the well, of a lead battery element post extending through the well, the base portion of the post having an exterior diameter the same as the interior diameter of the flange on the cell wall, the post then tapering upward and being screw-threaded, a rubber gasket fitting over said post and resting upon the inclined face of said flange, and a nut engaging the post and having a downwardly extending, annular flange, said flange having a uniform exterior diameter equal to the interior diameter of the upper end of the well, the interior face of the flange being inclined downward and outward whereby said flange will bear against the outer margin of the gasket force the gasket into contact with the inclined face of the flange on the well wall and thus force the gasket into contact with the post.

3. In a storage battery, the combination with a cell cover having a depending marginal flange and having post apertures defined by a depending wall having a depth below the cover equal to the depth of the marginal wall, two sets of battery plates, each set having a plate strap and a post extending upward from the plate strap and extending through the appropriate post aperture and having a diameter throughout its entire extent less than the internal diameter of the aperture, and manually adjustable means engaging each post to draw said post upward through the post aperture and hold the plate strap against the lower end of the wall surrounding the aperture and against the lower edge of the marginal wall of the cover.

4. In a storage battery, the combination with a battery cell, of a cover therefor having a downwardly extending marginal flange and having a post aperture defined by a downwardly extending wall, the lower edge of the wall and the lower face of the marginal flange being in the same plane, of battery plates disposed within the cell and having a plate strap equal in length to the width of the cover, a post extending upward from the plate strap and having a diameter throughout its entire extent less than but fitting the post aperture in the cover, and a nut engaging the post and engaging the cover, said nut holding the plate strap against the under face of the wall surrounding the aperture and against the under face of said marginal flange of the cover.

5. In a storage battery, the combination with a battery cell, of a cover therefor having a downwardly extending marginal flange and having a post aperture defined by a downwardly extending wall, the lower edge of the wall and the lower face of the marginal flange being in the same plane, of battery plates disposed within the cell and having a plate strap equal in length to the width of the cover, a post extending upward from the plate strap and having a diameter throughout its entire extent less than but fitting the post aperture in the cover, a nut engaging the post and engaging the cover, said nut holding the plate strap against the under face of the wall surrounding the aperture and against the under face of said marginal flange of the cover, the wall of the aperture being enlarged above its lower end, and a gasket being disposed around the post and within said enlarged portion of the wall and being engaged by said nut.

In testimony whereof I hereunto affix my signature.

J. EDWARD ERICKSON.